United States Patent [19]
Stark

[11] Patent Number: 6,145,824
[45] Date of Patent: Nov. 14, 2000

[54] QUICK CLAMPING CYLINDER AND RETRACTING AND CENTERING A DRAW-IN NIPPLE

[76] Inventor: Emil Stark, Komminger Str. 48, A-6840 Gotzis, Austria

[21] Appl. No.: 09/251,008

[22] Filed: Feb. 16, 1999

[30] Foreign Application Priority Data

Feb. 19, 1998 [DE] Germany ............... 198 06 961

[51] Int. Cl.[7] ................................................. B25B 1/00
[52] U.S. Cl. ........................................ 269/309; 269/20
[58] Field of Search ........................... 269/309, 20, 57; 254/931; 198/345.1

[56] References Cited

U.S. PATENT DOCUMENTS

| | | | |
|---|---|---|---|
| 3,986,617 | 10/1976 | Blomquist | 269/57 |
| 4,577,847 | 3/1986 | Schedwin . | |
| 4,703,916 | 11/1987 | Hung | 254/93 |
| 5,415,384 | 5/1995 | Obrist et al. | 269/309 |

FOREIGN PATENT DOCUMENTS

| | | | |
|---|---|---|---|
| 0356217 | 2/1990 | European Pat. Off. | 269/309 |
| 0441437 | 8/1991 | European Pat. Off. | 269/20 |
| 41 35 418 A1 | 5/1993 | Germany . | |
| 43 07 342 A1 | 9/1994 | Germany . | |
| 296 15 613 U 1 | 8/1997 | Germany . | |
| 196 36 375 A1 | 3/1998 | Germany . | |
| 405138471 | 6/1993 | Japan | 269/20 |

*Primary Examiner*—David A. Scherbel
*Assistant Examiner*—Daniel Shanley
*Attorney, Agent, or Firm*—Baker & Daniels

[57] ABSTRACT

Quick clamping cylinder for retracting and centering a draw-in nipple, in which the quick clamping cylinder contains a displaceable piston which is subjected to spring forces when retracting and to pressure fluid when releasing, the supply with pressure fluid being effected through the attaching means of the quick clamping cylinder.

19 Claims, 8 Drawing Sheets

QUICK CLAMPING CYLINDER AND RETRACTING AND CENTERING A DRAW-IN NIPPLE

BACKGROUND OF THE INVENTION

The present invention is concerned with a quick clamping cylinder according to the preamble of claim 1.

A similar type of quick clamping cylinder is known for example from DE 41 35 418 by the same applicant.

For details regarding the precise constructional makeup and effectiveness attention is drawn to this Offenlegungschrift, the disclosure of which is said to embrace fully the present application.

In this older application as well as in the present application the quick clamping cylinder is provided with a displaceably mounted piston. For retracting and centering a draw-in nipple the piston is subjected to a spring pressure. The piston is displaced, the draw-in nipple engaged, drawn in and centered. For releasing, the piston is subjected to a pressure fluid which effects a displacement in the opposite direction.

In the known embodiments the supply of this pressure fluid is effected via a connection fixed to a side wall of the quick clamping cylinder. For introducing the pressure fluid it is then necessary to provide a number of drillings, preferably arranged perpendicularly to each other. The attachment to as well as the closure of different outlet openings to these drillings is time consuming as well as costly.

The aim of the present invention therefore is to further develop a quick clamping cylinder of the type mentioned at the beginning in such a way that it can be manufactured more simply and more cost-effectively.

SUMMARY OF THE INVENTION

According to the invention this aim is achieved through the technical teaching of claim 1.

Essential in this case is the fact that the supply of the pressure fluid is achieved through the attaching means of the clamping cylinder.

This attaching means can be constructed as a part separate from the quick clamping cylinder or as one piece with the quick clamping cylinder. It is located directly above a table to which the quick clamping cylinder is attached. It is thus no longer necessary to provide a number of drillings arranged at an angle to each other, but one drilling only is now required. The manufacturing costs are reduced as fewer drillings have to be provided.

In the first of the said embodiment examples the attaching means is constructed as a part separate from the quick clamping cylinder. Available for this is the known type of shackle which is applied from above over the quick clamping cylinder and rests against a suitable stop.

In order to ensure a reliable supply of pressure fluid independently of the mutual angle position between quick clamping cylinder and attaching means, in a further development the outside of the quick clamping cylinder is provided with a continuous annular groove. Alternatively or additionally the attaching means can be provided with a corresponding continuous annular groove on its inside. The annular groove in the attaching means preferably has such a depth that it is in contact with a drilling for receiving a connection for the supply of the pressure fluid without requiring any additional work. This saves one processing stage. The annular grooves can of course be sealed through suitable seals.

For introducing the pressure fluid into the pressure chamber of the quick clamping cylinder there are provided one or a number of connecting bores which open into a continuous annular groove on the inside of the quick clamping cylinder. Depending on the configuration, this connecting bore may be split into two, wherein a first bore is provided in the quick clamping cylinder and a second bore is provided in the attaching means. These two bores can be arranged at an obtuse angle.

In another embodiment it is of course possible to have only one single connecting bore which is then preferably arranged completely in the quick clamping cylinder.

The said stop can be in the form of a ring which can be inserted in a corresponding groove of the quick clamping cylinder. Alternatively, the quick clamping cylinder can also be provided with a suitable projection.

In a preferred second embodiment the attaching means is constructed in one piece with the quick clamping cylinder, e.g. in the form of a continuous annular flange. In this annular flange is directly provided the connection for the supply of the pressure fluid which through a connecting bore is in contact with the already mentioned annular groove on the inside of the quick clamping cylinder. In both embodiment examples through this annular groove a good distribution of the pressure fluid is achieved over the entire circumference of the quick clamping cylinder.

For attaching the quick clamping cylinder to a table the attaching means can be provided with circular arc-shaped recesses or indentations.

The top side of the quick clamping cylinder is covered by a lid. Here too there are two possible embodiments. In a first embodiment example the outside of the lid is provided with a flange which slightly projects over the lid. This flange is a part of the quick clamping cylinder. This embodiment has the advantage that the entire height is determined alone by the quick clamping cylinder. Matching two or more parts in order to achieve a specific, precisely to be maintained height, is not required.

However, it is of course possible to leave out this flange of the quick clamping cylinder, so that the total height results from the sum total of the height of the quick clamping cylinder and the lid.

It is preferred if the quick clamping cylinder is manufactured as a cast or forged part. This reduces the production costs. When in use, only those surfaces are finished which require precision; the other surfaces remain unfinished. In particular the circular arc-shaped recesses and indentations in the attaching means can thus be pre-manufactured. Further processing is not necessary in this case, but can be carried in individual cases.

The subject of the present invention results not only from the subject of the individual patent claims, but also from a combination of the individual patent claims together.

BRIEF DESCRIPTION OF THE DRAWINGS

In the following the invention is explained in more detail with the aid of drawings, representing a number of embodiment examples. The drawings and their descriptions therefore disclose further features and advantages of the invention which are essential to the invention.

These show.

DETAILED DESCRIPTION

In the following description the same reference numerals are used for the same or similar parts. A description of the same or identical parts takes place once only with the aid of FIG. 1, the other figures refer back to this description.

Figure 1:
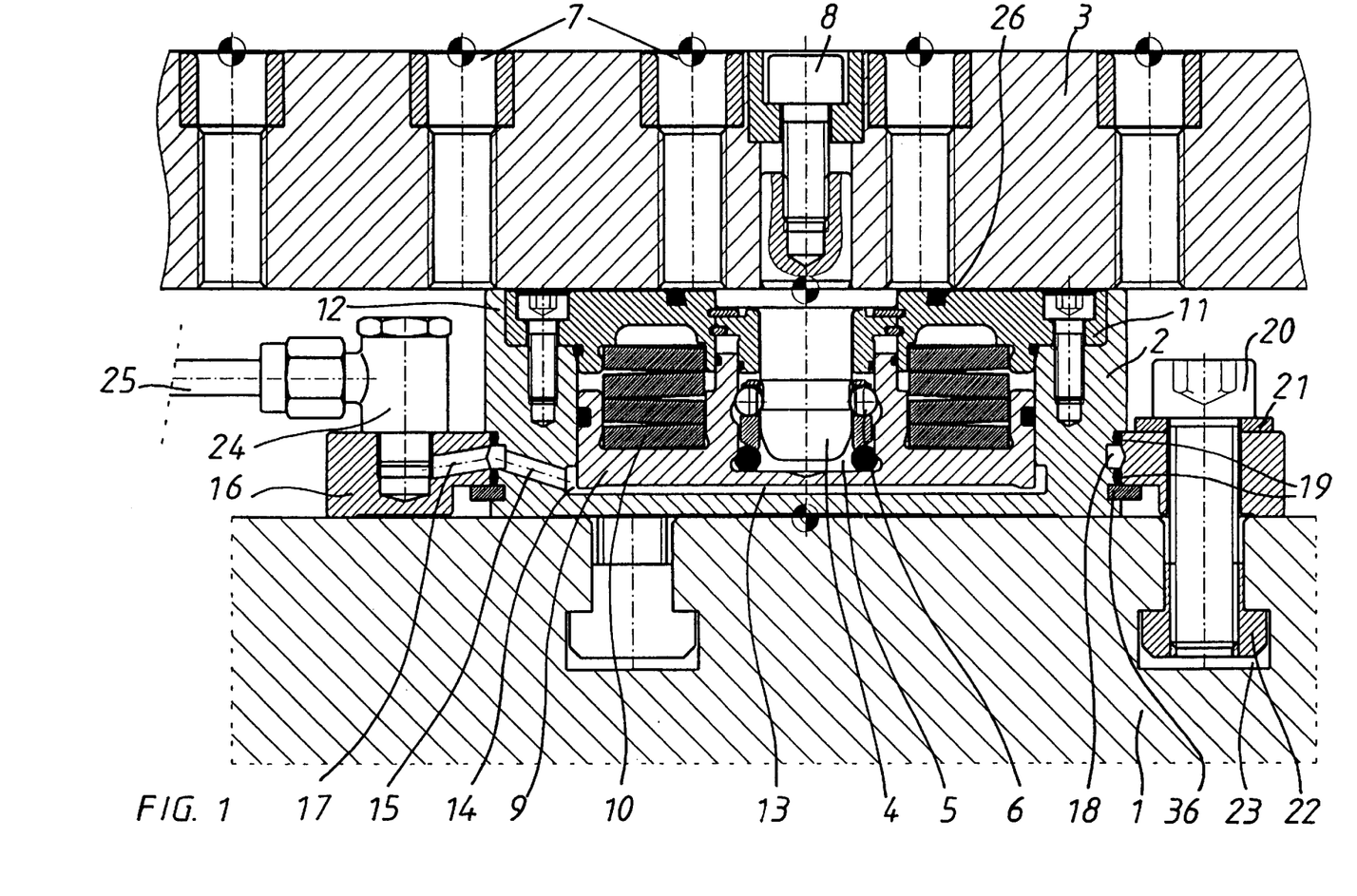
FIG. 1: a cross-section through a first embodiment example with a raised flange on the quick clamping cylinder.

FIG. 1 shows a cross-section through the quick clamping cylinder according to the invention in a first embodiment example. To a table 1 is attached a quick clamping cylinder 2 on which rests a pallet 3. The pallet 3 is provided with a nipple 4 which engages in a receptacle 5 of the quick clamping cylinder 2 and is held in this position by a ball cage 6. The pallet 3 is furthermore provided with positioning bores 7, the nipple 4 being retained by a screw 8.

The nipple 4 is centered in the quick clamping cylinder 2 so that the lateral position of the nipple 4 and thus also the pallet 3 as well as the positioning bore 7 is fixed exactly opposite the quick clamping cylinder 2, and thus opposite the table 1, and can be reproduced highly accurately. The vertical position is determined by the height of the quick clamping cylinder 2.

The quick clamping cylinder 2 is provided with a piston 9 which in FIG. 1 is pressed downwards by springs 10. The springs 10 are supported by the lid 11 which closes the quick clamping cylinder 2 at the top.

In the embodiment example shown the lid 11 is surrounded by a flange 12 of the quick clamping cylinder 2 which projects slightly from the lid 11. The vertical position is thus determined by the total height of the quick clamping cylinder.

Beneath the piston 9 is provided a pressure chamber 13 which is provided with a continuous annular groove 14 on the inside of the quick clamping cylinder 2. This pressure chamber 13 for releasing is provided with a pressure fluid which is introduced via a drilling 15 into the quick clamping cylinder 2 and via a drilling 17 in a shackle 16. The shackle 16 is fitted to the front via a connection 24 of a T-piece or L-piece and a pipe 25.

The quick clamping cylinder 2 as well as the shackle 16 are constructed to be essentially round. The angular position between these parts can thus change. In order to ensure that the pressure fluid reliably enters from the pipe 25 into the pressure chamber 13, the quick clamping cylinder 2 as well as the shackle 16 are provided with a continuous annular groove 18 on the inside or outside. This annular groove is sealed by suitable seals 19.

Figure 7:
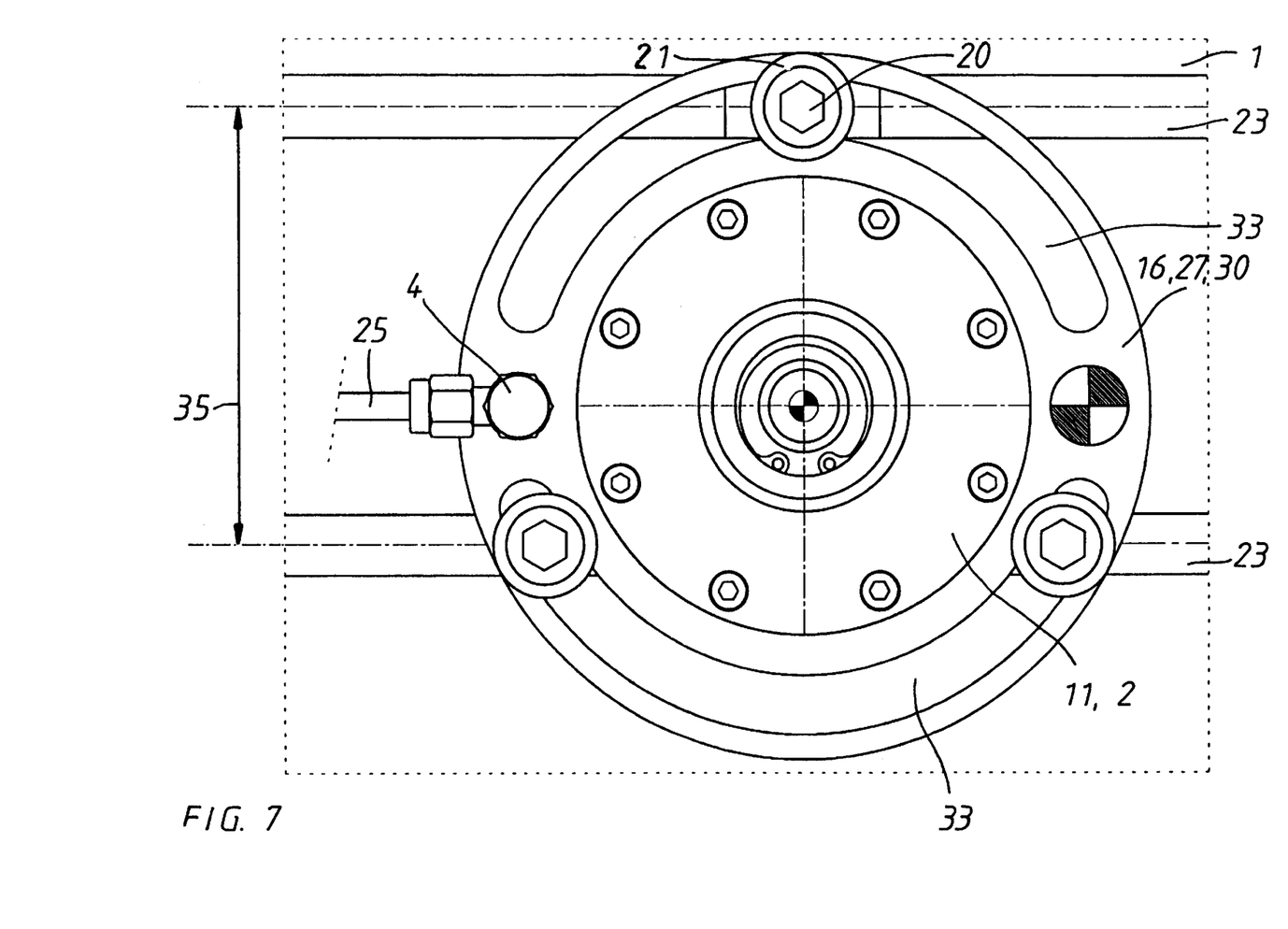
FIGS. 7 and 8: plan view of a quick clamping cylinder according to the FIGS. 2, 4 or 6 in two embodiment examples.
Figure 8:
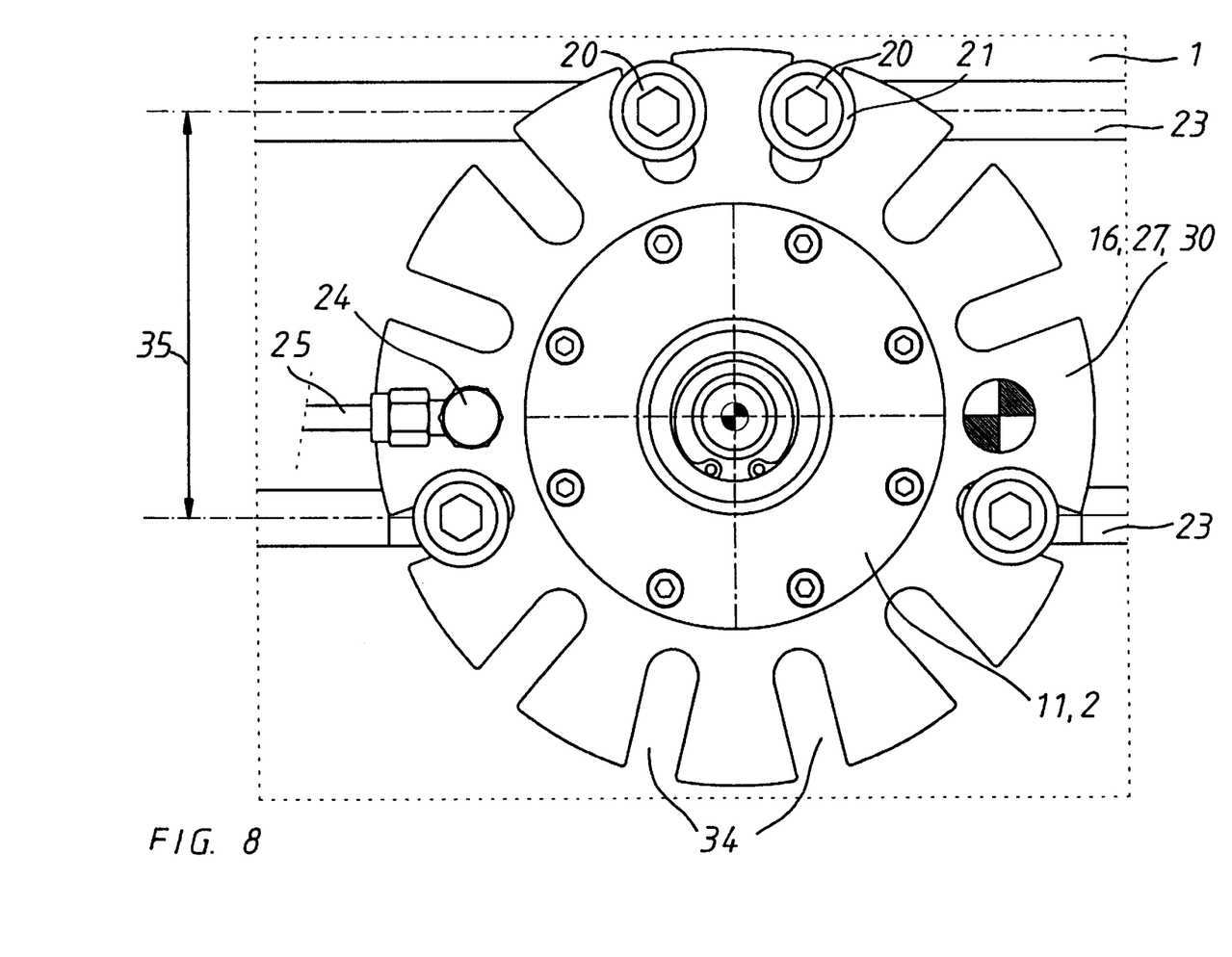

The attachment of the quick clamping cylinder 2 through the shackle 16 to the table 1 is effected by means of screws 20 which are provided with a washer and penetrate the shackle 16 in corresponding recesses 33 or perforations 34 (see FIGS. 7, 8). These screws 20 engage a head 22 which is received in a T-groove 23 of the table 1.

In the embodiment examples shown in FIG. 1 the shackle 16 in this case rests against a ring 36 which is received in a groove of the quick clamping cylinder 2.

The clamping takes place when the nipple 4 is inserted in the receptacle 5 of the quick clamping cylinder 2. The pipe 25 is then opened so that the springs 10 push the piston 9 downwards in FIG. 1. The pressure fluid thus flows from the pressure chamber 23 via the drillings 15, 17 and the pipe 25. The ball cage 6 is also pushed downwards slightly, whereby the individual balls move radially inwards. These balls then rest against an undercut of the draw-in nipple 4 and engage the same, so that the nipple 4 is drawn in towards the bottom and is centered at the same time. For releasing, pressure fluid is introduced into the pressure chamber 13 via the pipe 25 and the drillings 17, 15, thus raising the piston 9. The balls of the ball cage 6 can then move radially outwards in a groove of the hydraulic cylinder 10, so that the nipple 4 is released and the entire pallet 3 can be lifted off, optionally with workpieces or special devices mounted thereon.

The lid 11 can be provided with an O-ring which carries out both sealing as well as damping operations.

Figure 2:
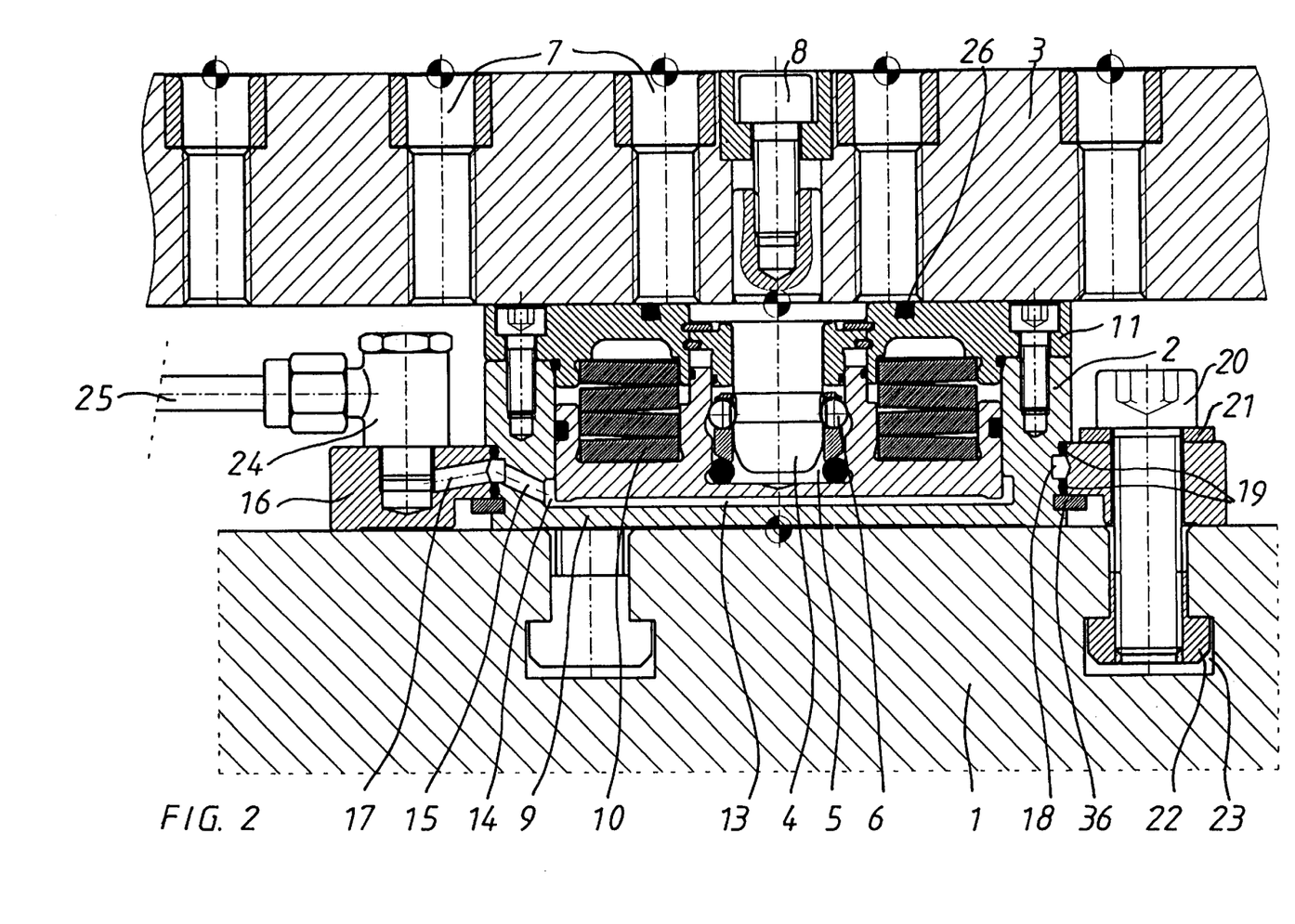
FIG. 2: a plan view of the embodiment example according to FIG. 1 without a raised flange.

In the embodiment example according to FIG. 2 the quick clamping cylinder 2 has an essentially smooth topside, so that the flange 12 becomes superfluous. The total height is therefore determined by the sum total of the height of the quick clamping cylinder 2 and the lid 11.

In the FIGS. 1 and 2 it is not absolutely necessary for the drillings 15, 17 to be arranged at a specific angle to each other. However, because of the retaining ring 36 there must be provided a certain distance between the annular groove 18 and this ring 36, so that drillings 15, 17 result which are altogether arranged at an obtuse angle to each other.

The connection 24 may be in the form of a T-piece or an L-piece. The use of a T-piece is recommended when it is necessary to couple together a number of quick clamping cylinders 2.

The total height of shackle 16 and connection 24 is therefore less than the total height of quick clamping cylinder 2 and lid 11, so that the pallet 3 does not rest on the connection 24.

Figure 3:
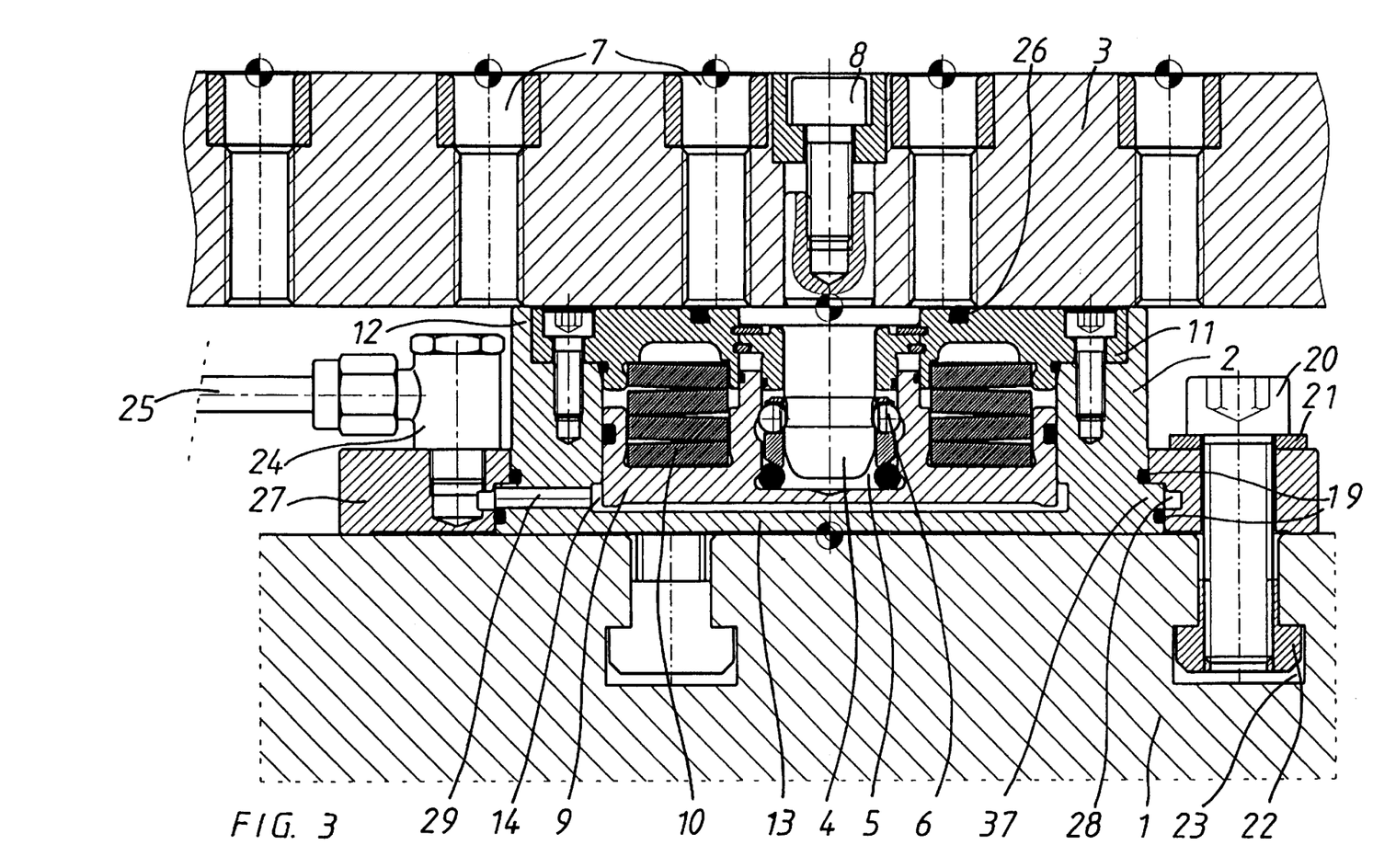
FIGS. 3 and 4: views according to FIGS. 1 and 2 in a second embodiment example.
Figure 4:
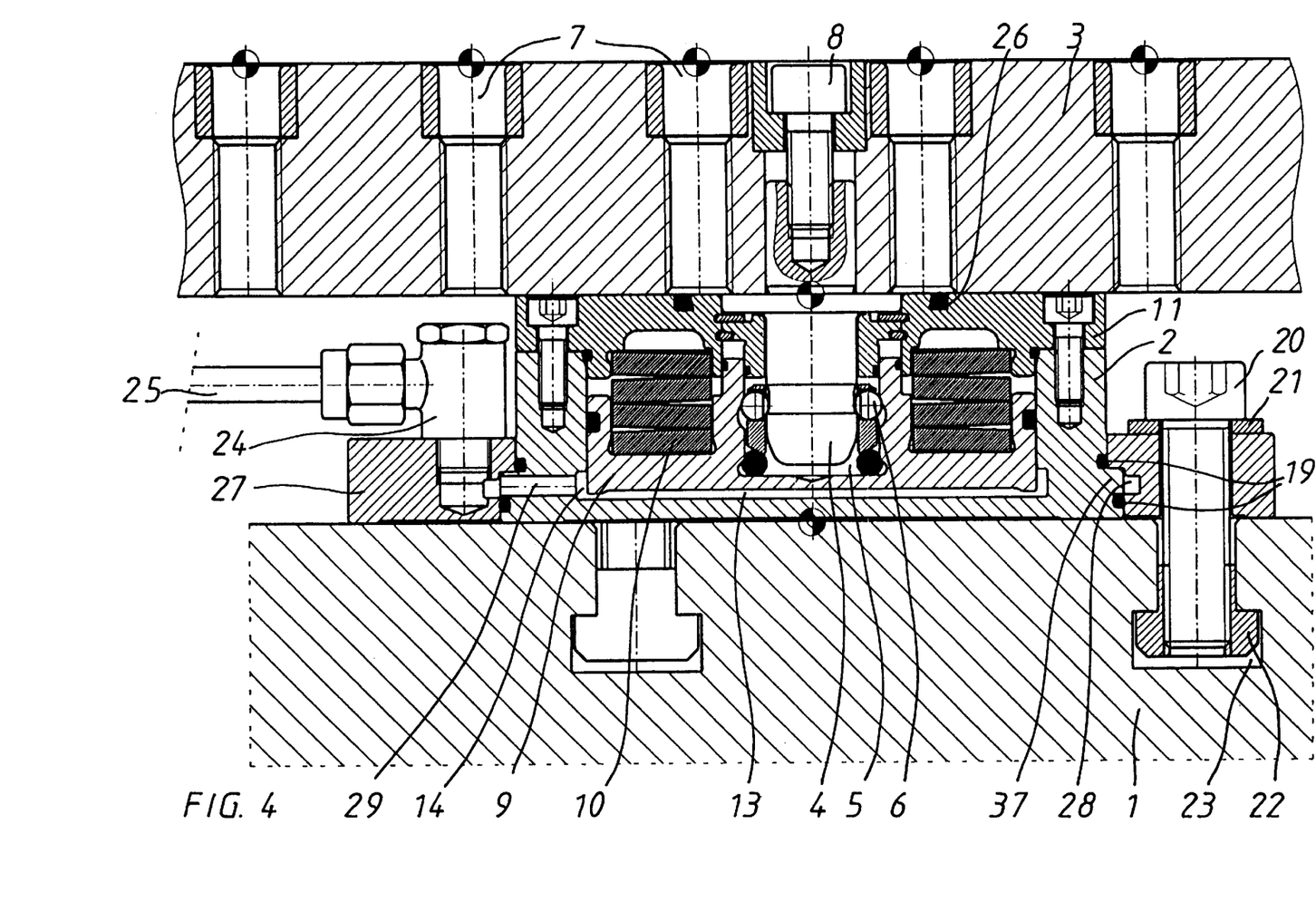

In the embodiment example according to FIGS. 3 and 4 another shackle 27 is used which, through a projection 37, presses onto the quick clamping cylinder 2. The inside of the shackle 27 is again provided with a continuous annular groove 28 which again is sealed by seals 19. The annular groove 18 on the outside of the quick clamping cylinder 2, shown in FIGS. 1 and 2, becomes superfluous.

The annular groove 28 is constructed to be of such a depth that the drillings of the connection 24 are directly connected to it and no additional drilling is required.

The quick clamping cylinder 2 is provided with a drilling 29 which runs essentially horizontally. The drilling is supplied from outside via the annular groove 28 of the shackle 27 and in turn opens into an annular groove 14 on the inside of the quick clamping cylinder.

As in the FIGS. 1 and 2, the quick clamping cylinder can also be provided with a flange 12 (FIG. 3); but this flange may also be left out (FIG. 4).

Figure 5:
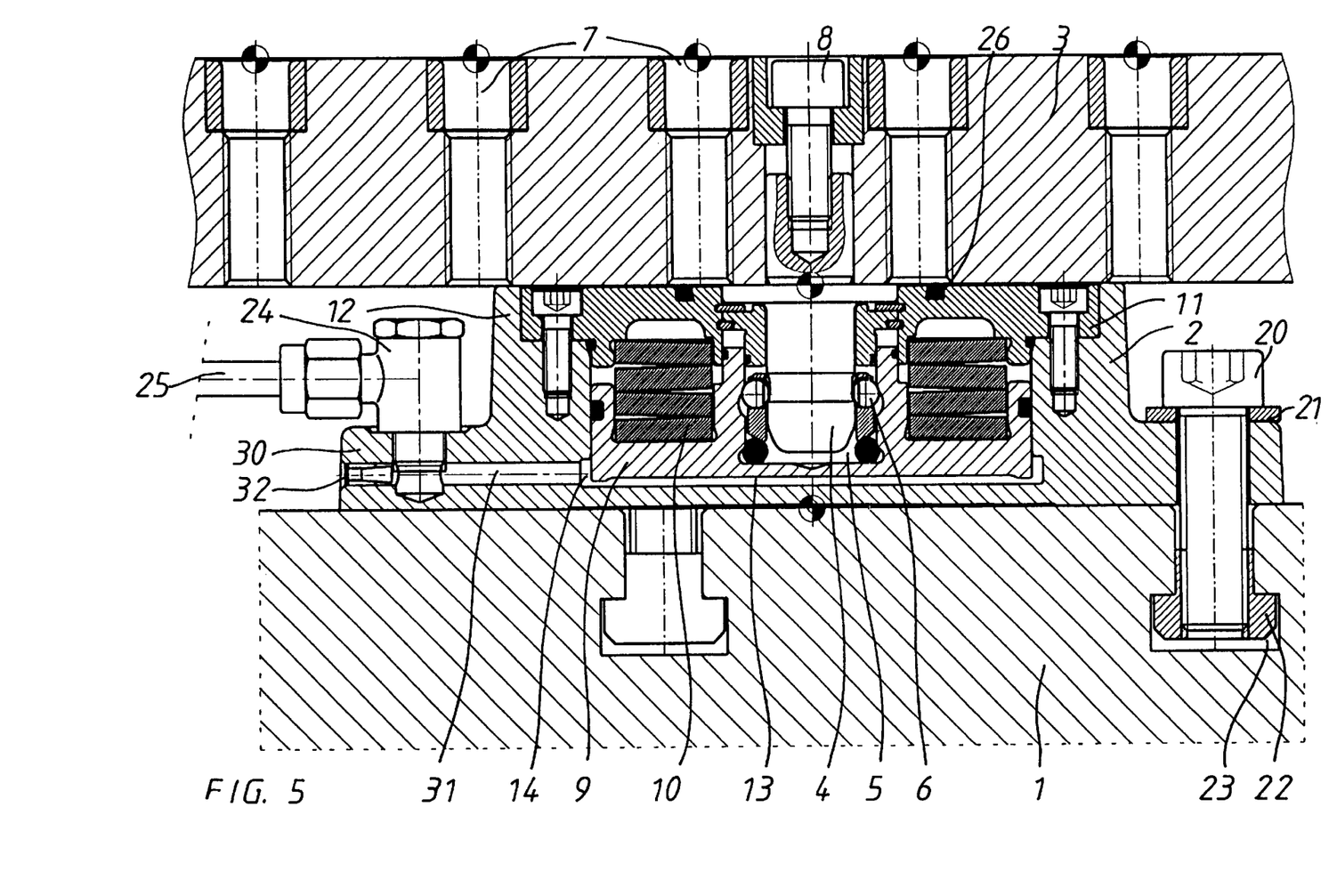
FIGS. 5 and 6: views according to FIGS. 1 and 2 in a third embodiment example.
Figure 6:
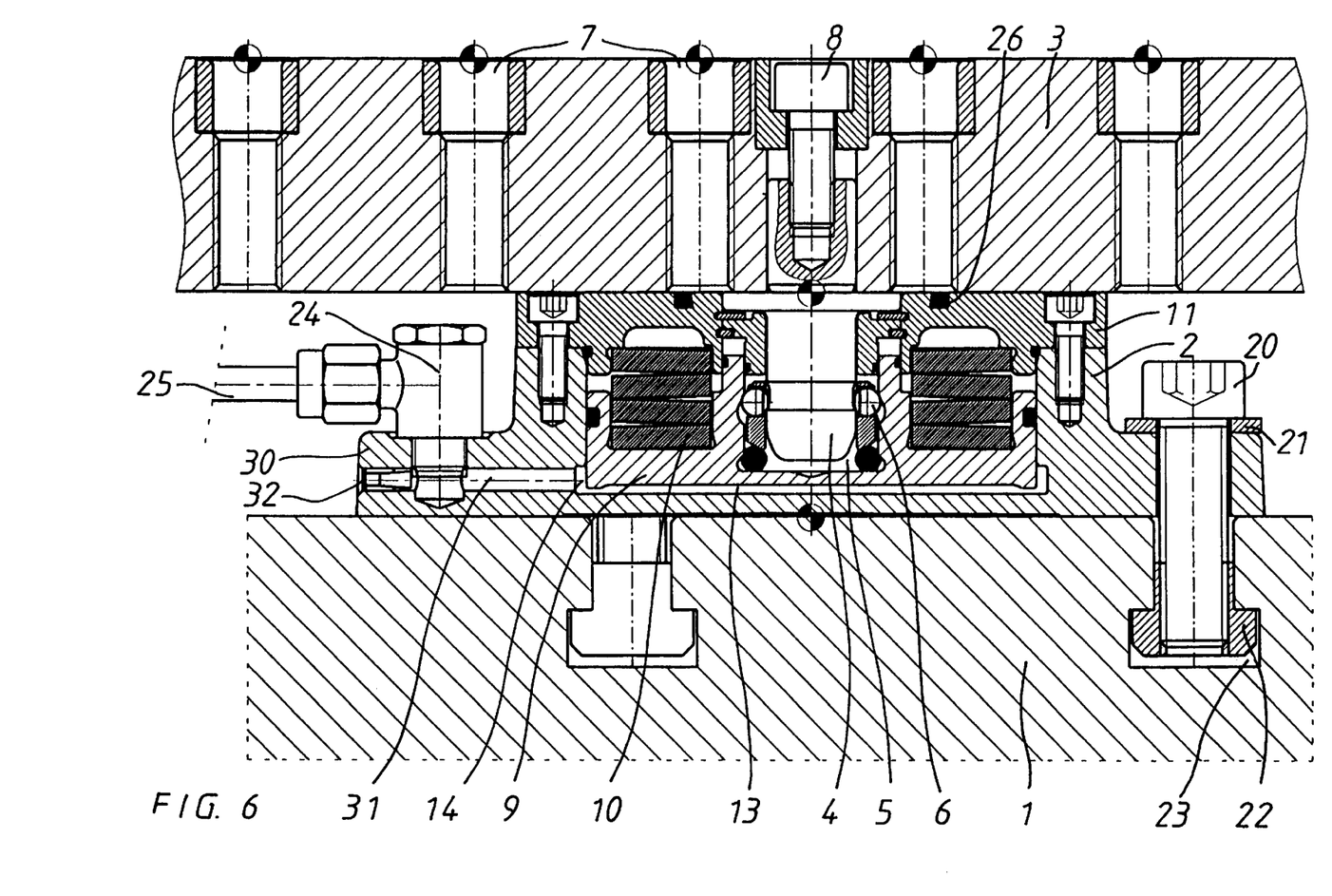

The FIGS. 5 and 6 show a third embodiment example. FIG. 5 again shows a quick clamping cylinder 2 with the flange 12 as in the FIGS. 1 and 3, whilst in FIG. 6 this flange 12 is left out.

In the FIGS. 5 and 6 is provided as attaching means a flange 30 which is joined in one piece with the quick clamping cylinder 2. The supply of the pressure fluid into the pressure chamber takes place via a drilling 31, which is closed on the outside of the flange 30 by a stopper 32.

Advantageous in this embodiment example according to FIGS. 5 and 6 is that the seals between the attaching means and the quick clamping cylinder may become obsolete. Moreover, the quick clamping cylinder 2 may be cast, as can be seen for example by the mold draft. Finishing takes place only in the region of the contact surfaces.

In order to keep the surface to be finished altogether as small as possible, in all the embodiment examples the quick clamping cylinder 2 is provided on its underside with a depression, approximately in the center. This depression is shown as a thick, black line in FIGS. 1 to 6.

In the FIGS. 7 and 8 are shown plan view of quick clamping cylinders according to the FIGS. 2, 4 and 6. This can be seen by the fact that the flange 12 is not shown. However, the attachment of such a quick clamping cylinder with edge 12 is effected in a similar way.

Each attaching means 16, 27, 30 may be provided with either approximately circular arc-shaped recesses 33 (FIG. 7) or a number of indentations 34 (FIG. 8). Although only one single connection 24 is shown, it is of course possible to have several of these connections, e.g. at oppositely located positions of the attaching means 16, 27, 30.

As already described in the introduction to the description, the recesses 33 and indentations 34 are already introduced during the manufacturing process during casting or forging. A special finishing process is not required. Only the contact and connecting surfaces on the top and underside of the attaching means 16, 27, 30 need to be finished.

When attaching the quick clamping cylinder 2, care has to be taken that this is secured with three screws 20. These screws 20 should if possible be evenly arranged, i.e. they should be placed at an angle of 120 to each other. Depending on the distance 35 between the T-grooves 23, different quick clamping cylinders or different attaching means 16, 27, 30 most therefore be used.

Altogether the present invention results in a much simpler and more cost effective construction than is the case with hitherto known quick clamping cylinders.

Drawing Legend 1. table
2. quick clamping cylinder
3. pallet
4. nipple
5. receptacle
6. ball cage
7. positioning bore
8. screw
9. piston
10. spring
11. lid
12. flange
13. pressure chamber
14. annular groove
15. drilling
16. shackle
17. drilling
18. annular groove
19. seal
20. screw
21. washer
22. head
23. T-groove
24. T-piece/L-piece
25. supply pipe
26. O-ring
27. shackle
28. annular groove
29. drilling
30. flange
31. drilling
32. stopper
33. recess
34. indentation
35. distance
36. ring
37. projection

What is claimed is:

1. Quick clamping cylinder for retracting and centering a draw-in nipple, in which the quick clamping cylinder contains a displaceable piston which is subjected to spring forces when retracting and to pressure fluid when releasing, characterized in that a supply of the pressure fluid is effected through an attaching means of the quick clamping cylinder to a supporting table, the supply of pressure fluid being disposed externally of the supporting table, whereby said cylinder attaching means can be repositioned relative to the table.

2. Quick clamping cylinder according to claim 1, characterised in that the attaching means is constructed to be a part separate from the quick clamping cylinder.

3. Quick clamping cylinder according to claim 2, characterised in that the outside of the quick clamping cylinder is provided with a continuous annular groove.

4. Quick clamping cylinder according to claim 2, characterised in that the inside of the attaching means is provided with a continuous annular groove.

5. Quick clamping cylinder according to claim 4, characterised in that the annular groove has such a depth that it is in contact with a drilling for receiving a connection for the supply of the pressure fluid.

6. Quick clamping cylinder according to claim 3, characterised in that the annular grooves are provided with seals.

7. Quick clamping cylinder according to claim 2, characterised in that at least one connecting bore is provided for supplying the pressure fluid into a pressure chamber of the quick clamping cylinder, which opens into a continuous groove on the inside of the quick clamping cylinder.

8. Quick clamping cylinder according to claim 7, characterised in that the connecting bore is split into two and a first drilling is provided in the quick clamping cylinder and a second drilling is provided in the attaching means.

9. Quick clamping cylinder according to claim 8, characterised in that the two drillings are arranged at an obtuse angle to each other.

10. Quick clamping cylinder according to claim 7, characterised in that only one connecting bore is provided which is arranged completely in the quick clamping cylinder.

11. Quick clamping cylinder according to claim 2, characterised in that the outside of the quick clamping cylinder is provided with a stop for the attaching means.

12. Quick clamping cylinder according to claim 11, characterised in that the stop is constructed to be a ring or a projection.

13. Quick clamping cylinder according to claim 1, characterised in that the attaching means is constructed in one piece with the quick clamping cylinder.

14. Quick clamping cylinder according to claim 1, characterised in that the attaching means is provided with circular arc-shaped recesses.

15. Quick clamping cylinder according to claim 1, characterised in that the attaching means are provided with indentations.

16. Quick clamping cylinder according to claim 1, characterised in that the quick clamping cylinder is provided with a lid which is surrounded on the outside by a flange which projects slightly over the lid.

17. Quick clamping cylinder according to claim 1, characterised in that the quick clamping cylinder is a cast or forged part.

18. Quick clamping cylinder according to claim 1, wherein the cylinder attaching means is adjustably rotatable on the supporting table.

19. Quick clamping cylinder for retracting and centering a draw-in nipple, in which the quick clamping cylinder contains a displaceable piston which is subjected to spring forces when retracting and to pressure fluid when releasing, characterized in that a supply of the pressure fluid is effected through an attaching means of the quick clamping cylinder to a supporting table, the cylinder attaching means being adjustably rotatable on the supporting table.

* * * * *

UNITED STATES PATENT AND TRADEMARK OFFICE
CERTIFICATE OF CORRECTION

PATENT NO : 6,145,824
DATED : November 14, 2000
INVENTOR(S) : Emil Stark

It is certified that error appears in the above-identified patent and that said Letters Patent are hereby corrected as shown below:

On title page, and column 1,

In the Title:

delete "and" and substitute therefor --for--

Signed and Sealed this

Twenty-ninth Day of May, 2001

Attest:

NICHOLAS P. GODICI

*Attesting Officer*  *Acting Director of the United States Patent and Trademark Office*